F. L. SAWYER.
SIGNAL APPARATUS FOR MOTOR VEHICLES.
APPLICATION FILED MAY 26, 1914.

1,198,063.

Patented Sept. 12, 1916.
3 SHEETS—SHEET 1.

F. L. SAWYER.
SIGNAL APPARATUS FOR MOTOR VEHICLES.
APPLICATION FILED MAY 26, 1914.

1,198,063.

Patented Sept. 12, 1916.
3 SHEETS—SHEET 2.

Witnesses
Augustus F. Friend
A. F. Macready.

Inventor
Frank L. Sawyer
By
Howard E. Barlow
Attorney

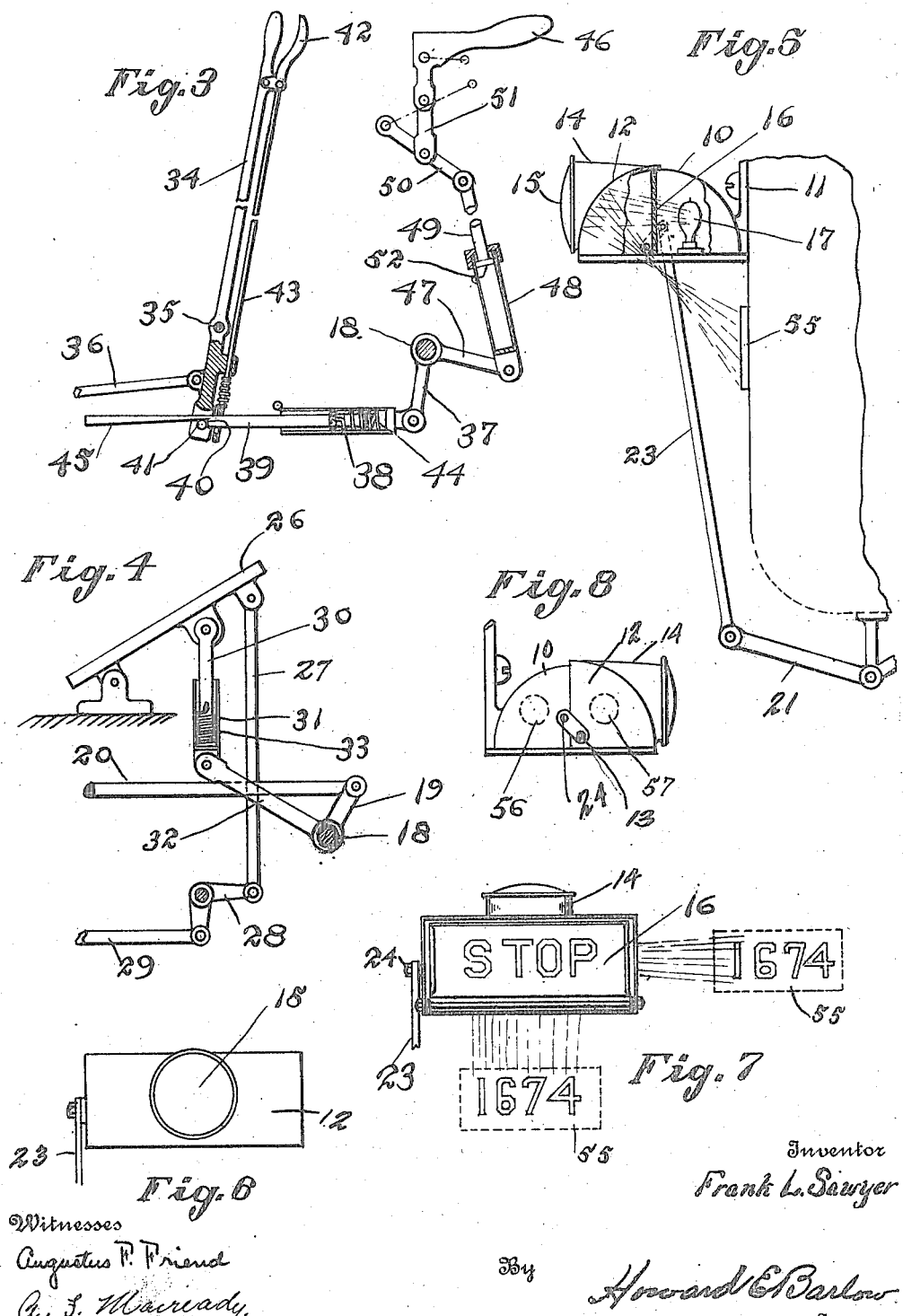

UNITED STATES PATENT OFFICE.

FRANK L. SAWYER, OF PROVIDENCE, RHODE ISLAND.

SIGNAL APPARATUS FOR MOTOR-VEHICLES.

1,198,063. Specification of Letters Patent. Patented Sept. 12, 1916.

Application filed May 26, 1914. Serial No. 841,157.

*To all whom it may concern:*

Be it known that I, FRANK L. SAWYER, citizen of the United States, and resident of the city of Providence, in the county of Providence and State of Rhode Island, have invented certain new and useful Improvements in Signal Apparatus for Motor-Vehicles, of which the following is a specification.

This invention relates to signal apparatus for motor vehicles and has for its object to provide a cautionary signal at the rear of a vehicle adapted to be displayed by the operation of a special lever for that purpose, or it may be set automatically by the mechanism employed for setting the brakes its purpose being to notify vehicles approaching from the rear, that he is about to slow down or stop and the one behind must govern himself accordingly.

A further object of the invention is to provide means for illuminating the signal by night to forcibly call the attention of the following vehicle thereto and to also provide means whereby the lamp may be automatically lighted when the means for displaying the signal is operated.

Some districts have laws compelling drivers of vehicles to signal to following vehicles, by throwing out of the hand, as a warning that they are about to slow down or to turn to one side, but in some cases it is impractical for the driver to do this, as at that time both hands are busily engaged in the management of his machine, then again after dark, a signal of this character could not be seen, rendering traffic in crowded districts dangerous. To obviate this difficulty I have provided a device that is operated automatically by the application of the brakes, for displaying an illuminated cautionary signal at the rear of the vehicle which is sure to be operated when the vehicle slows down and the approaching vehicle properly notified by a signal he cannot fail to observe.

With these and other objects in view, the invention consists of certain new and novel features of construction, as will be more fully described and particularly pointed out in the appended claims.

Figure 1:
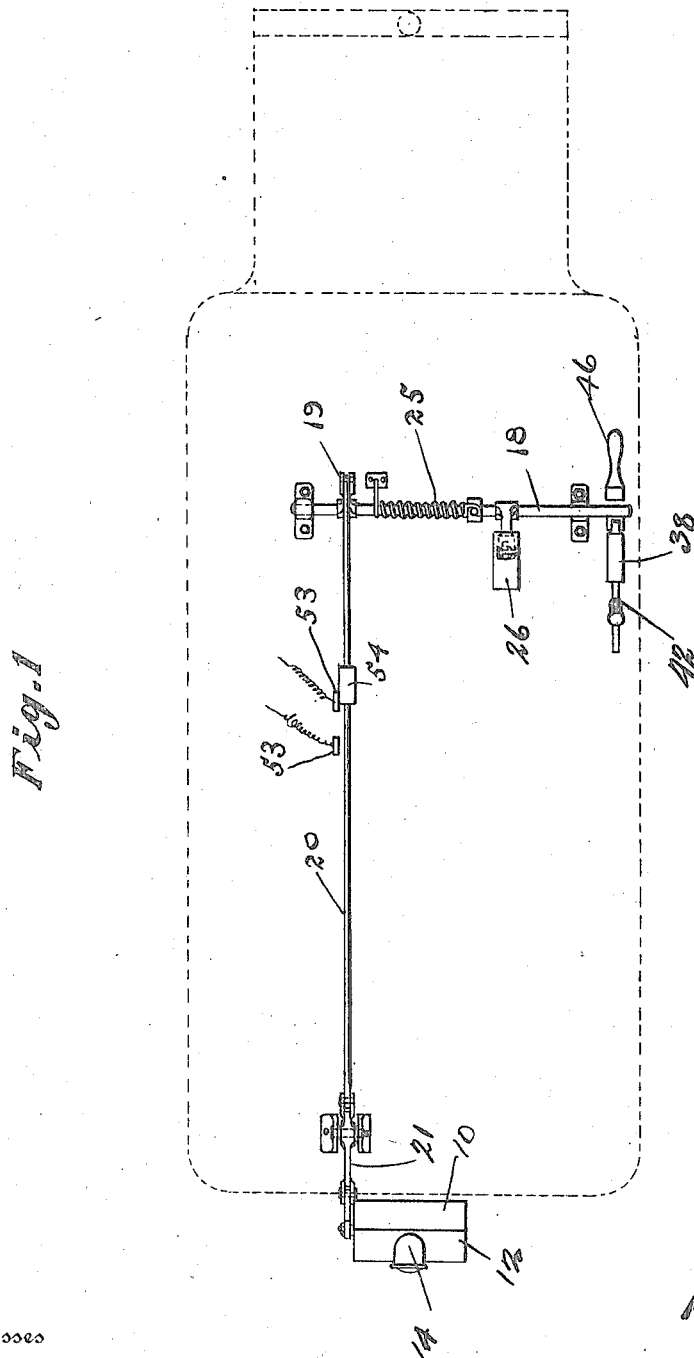
Figure 2:
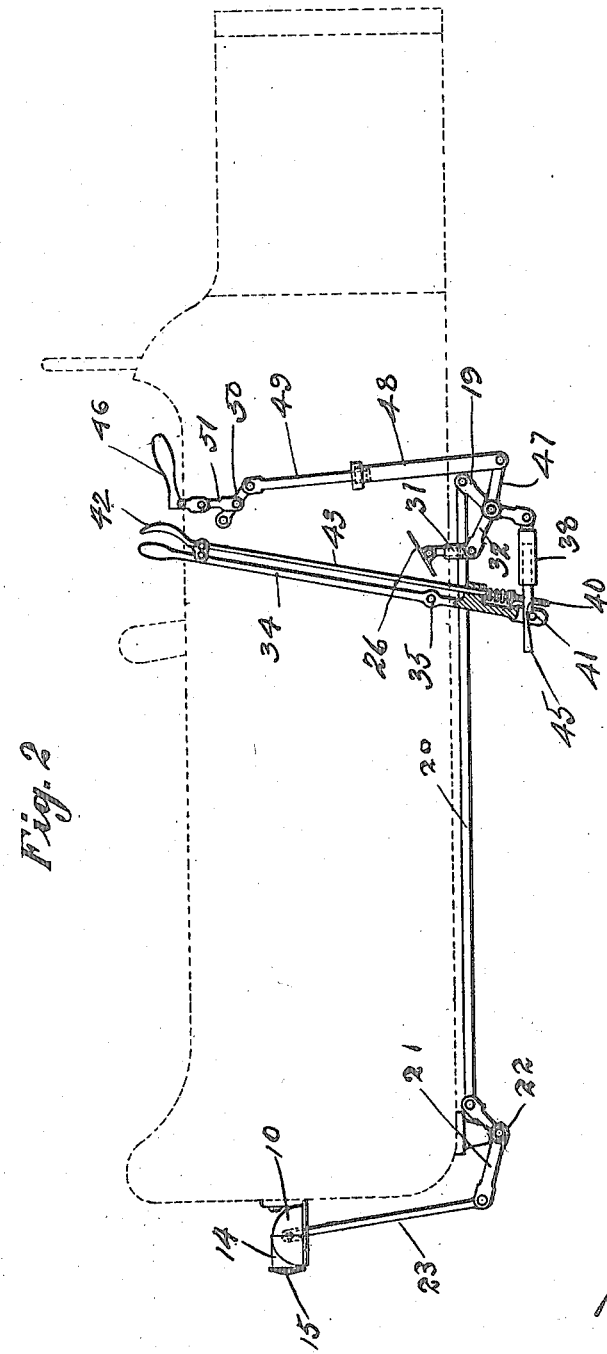

In the accompanying drawings: Figure 1— is a plan view illustrating the outline of the vehicle body in dotted lines and my improved signal displaying device connected thereto. Fig. 2— is a side elevation of my improved signal operating mechanism as applied to a vehicle, the body portion being indicated in dotted lines. Fig. 3— is an enlarged view of the hand mechanism for operating the signal also showing the connection between this hand mechanism and the emergency brake lever. Fig. 4— is a side elevation of the foot brake operating lever showing the connection thereto, whereby the movement of this foot lever may also operate the mechanism for displaying the signal. Fig. 5— is a side elevation showing the signal casing attached to the rear of the automobile body and showing a portion of the actuating mechanism connected thereto, also showing the angles of the rays of light for indirectly illuminating the number plate located below or to the side of the signal casing. Fig. 6— is a view from the rear of the machine showing the signal casing and the red bull's-eye used as a danger signal, which is also illuminated from the light within the casing. Fig. 7— is a view from the rear of the machine showing the movable portion of the casing as raised to expose the cautionary signal. Fig. 8— is a side elevation of the signal casing showing the connection to the moving portion of the casing whereby the same is operated to be moved to open or closed position.

Referring to the drawings 10 designates the main portion of the signal casing which is fixed at 11 to the rear portion of the body of the vehicle. The front movable portion 12 of the casing is pivoted to the fixed portion at the point 13 and is provided with a built out rearwardly extending tubular portion 14 in which is mounted a red bull's-eye through which the light from within shines to serve as a danger signal at night. A plate 16 is mounted in the fixed portion of the casing, which is preferably of a red color and has located thereon the word—Stop—in such a position that when the movable portion of the casing is raised this cautionary signal is exposed. In the fixed portion of this casing I mount a suitable source of illumination preferably one or more electric lamps 17, which may be lighted in the usual way, or by special mechanism hereinafter described. In order to control the action of this signal device so as to assure its positive operation at the time when required, I have provided a transverse shaft 18 mounted near the forward portion of the vehicle and to which shaft this movable portion of the casing is connected by the arm 19, connecting rod 20, bell crank 21 mounted on the shaft 22 at the rear of the machine and connecting rod 23, which is pivotally connected at 24 to said movable portion 25 the tension of which serves to rotate the shaft and through connections above described retain the movable portion of the casing normally in closed position. In order that this shaft may be readily and easily controlled by the operator of the car I have provided three distinct devices by which the shaft may be operated, and by each device independent of the others to expose the cautionary signal. One of these connecting devices is the ordinary foot brake pedal 26 which is connected through the connector 27, bell-crank 28 and rod 29 to the usual brakes, not shown. This foot lever is also shown as being connected to the shaft 18 through the spindle 30, tubular member 31 and arm 32, whereby the downward movement of the outer end of this foot lever in addition to operating the brakes also serves to set the cautionary signal. In order to permit the signal shaft 18 to be operated independently of this foot lever, I have provided a tube 31 in which the pin 30 is mounted to slide freely, whereby the rotation of the shaft 18 would move the arm 32 and tube 31 downward without movement of the foot lever. A spring 33 on the lower end of this pin serves as a cushion to yieldably engage and operate the signal mechanism. In some cases when the emergency brake is applied without operating the foot brake, it is desirable that this brake should also be arranged to set the cautionary signal, therefore, I have arranged that the lever 34 which is pivoted at 35 and connected in the usual way through connector 36 to the emergency brakes, not shown, may also be connected to operate the shaft 18 through the arm 37, tubular member 38, the central spindle 39, which spindle is notched at 40 to engage the pin 41 at the lower end of the lever 34. When it is desired to operate this lever without actuating the signal shaft 18, the latch 42 is pressed, thereby raising through the rod 43 the notched end of the rod 39 above the pin 41, whereby this lever may be operated to set the brakes without operating the signal. Then again it is found advisable to permit the signal shaft 18 to be rotated to set the signals without effecting the connection with this emergency brake lever. To accomplish this the spindle is provided with an extending end portion 45, whereby it is adapted to slide back and forth on the pin 41 and permit the free movement of the shaft 18 independent of the lever 34. The spring 44 in the tube 38 is for the purpose of providing a cushioned or yielding effect when the shaft 18 is operated by the movement of the lever 34. I have now described the action of both of the brake operating devices upon the shaft 18, but in some cases it is found advisable to be able to operate this signal mechanism without operating either of the brakes, therefore, I have provided a separate and independent hand operated lever 46—see Figs. 2 and 3—which is connected by the arm 47, tubular member 48, connector 49, arm 50 and link 51 to this operating handle 46, whereby the upward movement of said handle causes the head 52 of the connector 49 to engage the end of the tube 48 and so rotate the shaft 18 to expose the signal. It will be noted by the construction above described that this hand operated lever 46 may be moved to operate the shaft entirely independent of the two brake mechanisms either the foot brake or the emergency brake may be set and operate the signal independent of the movement of the hand lever 46.

In some cases it is found advisable to provide an electric circuit for the signal lamp and to provide means on the signal setting mechanism to automatically light this lamp when the cautionary signal is displayed. To accomplish this I have provided a pair of contact blocks 53 in the lamp circuit and a switch block on the longitudinally moving rod 20, whereby when said rod is moved to set the cautionary signal the block 54 bridges the contacts 53 and completes the circuit to light the lamp.

In some cases it is desired to illuminate the registry number plate by the light in the casing. To do this, this plate 55 may be secured below the casing and the light reflected thereonto by first passing through the plate 16 and redirected from the rear end of the casing upon the face of the plate 55 located below, or in some cases, one end of the casing may be provided with a light directing aperture as at 56—see Fig. 8—and the plate in that case would be placed to one side of the casing, whereby the light would pass transversely onto the plate. A second glass covered aperture 57 in the movable portion of the casing may also be provided to register with the first aperture 56 when the movable portion is thrown back to expose the cautionary signal.

I claim:

1. A signal apparatus for motor vehicles, comprising a signal mounted on the rear of the vehicle, a rock shaft mounted on the forward end of said vehicle, connections between said rock shaft and signal for operating the latter, a handle, connections between said handle and said rock shaft for operating the latter to display said signal, an emergency brake lever, an arm connected with said rock shaft and having a lost motion connection with said brake lever, and a latch mechanism carried by said brake lever engaging said arm to disengage the latter from said brake lever, whereby said emergency brake lever may be operated without affecting said signal.

2. A signal apparatus for motor vehicles, comprising a signal mounted on the rear of the vehicle, a rock shaft mounted on the forward end of said vehicle, connections between said rock shaft and signal for operating the latter, a handle, connections between said handle and said rock shaft for operating the latter to display said signal, an emergency brake lever, a sleeve connected with said rock shaft, an arm telescoping with said sleeve and having a lost motion connection with said brake lever, a spring interposed between said arm and said sleeve, and a latch mechanism carried by the brake lever and engaging said arm to disengage the latter from the brake lever, whereby said emergency brake lever may be operated without affecting said signal.

3. A signal apparatus for vehicles comprising a signal mounted on the rear of the vehicle, a rock shaft mounted on the forward end of said vehicle, connections between said rock shaft and signal for operating the latter, a handle, connections between said handle and rock shaft for operating said rock shaft to display said signal, a brake pedal having a depending spindle, a sleeve connected with said rock shaft and telescoping with said spindle, and a spring interposed between said spindle and said sleeve.

4. A signal apparatus for motor vehicles, comprising a signal mounted on the rear thereof, a rock shaft mounted on the forward end of said vehicle, connections between said rock shaft and signal for operating the latter, a handle, a connector attached thereto, a sleeve attached to said rock shaft and telescoping with said connector, means interposed between said connector and said sleeve for effecting movement of the sleeve to operate the rock shaft to display said signal, an emergency brake lever, connections between said brake lever and said rock shaft for operating said rock shaft to display said signal, and means disposed in the connection between said brake lever and said rock shaft to prevent the operation of said brake lever when said rock shaft is operated from said handle.

5. A signal apparatus for motor vehicles, comprising a signal mounted on the rear of a vehicle, a rock shaft mounted on the forward end of said vehicle, connections between said rock shaft and signal for operating the latter, a handle, a connector attached thereto, a sleeve attached to said rock shaft and telescoping with said connector, means interposed between said connector and said sleeve for effecting movement of the sleeve to operate the rock shaft to display said signal, an emergency brake lever, an arm connected with said rock shaft and having a lost motion connection with said brake lever, and a latch mechanism carried by said brake lever and engaging said arm to disengage the latter from said brake lever, whereby said emergency brake lever may be operated without affecting said signal.

6. A signal apparatus for motor vehicles, comprising a signal mounted on the rear of a vehicle, a rock shaft mounted on the forward end of said vehicle, connections between said rock shaft and signal for operating the latter, a handle, connections between said handle and said rock shaft for operating the latter to display said signal, an emergency brake lever provided with an abutment pin, an arm slidably engaging said abutment pin, said arm having a shoulder coöperating with said pin, means for connecting said arm with said rock shaft and a latch mechanism carried by the brake lever and engaging said arm to disengage said shoulder and said abutment pin, whereby the emergency brake lever may be operated without affecting the signal.

In testimony whereof I affix my signature in presence of two witnesses.

FRANK L. SAWYER.

Witnesses:
HOWARD E. BARLOW,
A. F. MACREADY.